(12) United States Patent
Colliver et al.

(10) Patent No.: US 8,088,424 B2
(45) Date of Patent: Jan. 3, 2012

(54) PROCESS FOR MANUFACTURING TEA PRODUCTS

(75) Inventors: Steven Peter Colliver, Sharnbrook (GB); David George Sharp, Sharnbrook (GB)

(73) Assignee: Conopco, Inc.,, Englewood Cliffs, NJ (US)

( * ) Notice: Subject to any disclaimer, the term of this patent is extended or adjusted under 35 U.S.C. 154(b) by 395 days.

(21) Appl. No.: 12/290,861

(22) Filed: Nov. 4, 2008

(65) Prior Publication Data

US 2009/0117251 A1 May 7, 2009

(30) Foreign Application Priority Data

| Nov. 5, 2007 | (EP) | 07119988 |
| Nov. 12, 2007 | (EP) | 07120448 |
| Dec. 19, 2007 | (EP) | 07123586 |
| Feb. 7, 2008 | (EP) | 08151155 |
| Oct. 2, 2008 | (EP) | 08165775 |
| Oct. 2, 2008 | (EP) | 08165776 |

(51) Int. Cl.
*A23F 3/34* (2006.01)

(52) U.S. Cl. ............... 426/435; 426/597; 426/489

(58) Field of Classification Search .......... 426/597, 426/435, 415

See application file for complete search history.

(56) References Cited

U.S. PATENT DOCUMENTS

| 3,821,440 A | 6/1974 | Reeve ............ 426/312 |
| 4,051,264 A | 9/1977 | Sanderson et al. ...... 426/52 |
| 4,880,656 A | 11/1989 | Schutz et al. ............ 426/386 |
| 7,074,451 B2 | 7/2006 | Succar et al. ........... 426/478 |
| 7,108,877 B2 | 9/2006 | Blair et al. ........... 426/49 |
| 7,232,585 B2 | 6/2007 | Quan et al. ........... 426/597 |
| 2004/0001862 A1 | 1/2004 | Xiu ............ 424/195.17 |
| 2004/0180077 A1 | 9/2004 | Riker et al. ........... 424/439 |
| 2005/0008753 A1 | 1/2005 | Honda et al. ............ 426/590 |
| 2005/0181079 A1 | 8/2005 | Koganov ............ 424/729 |
| 2006/0210653 A1 | 9/2006 | Gardiner et al. ........... 424/729 |
| 2006/0257547 A1 | 11/2006 | Honda et al. .......... 426/597 |
| 2007/0071870 A1 | 3/2007 | You .............. 426/597 |
| 2007/0231445 A1 | 10/2007 | Gehrig et al. ........... 426/597 |

FOREIGN PATENT DOCUMENTS

| CN | 1 039 525 | 2/1990 |
| CN | 1 219 359 | 6/1999 |
| CN | 1 266 625 | 9/2000 |
| CN | 1 356 054 | 7/2002 |
| CN | 1 396 249 | 2/2003 |
| CN | 1 718 030 | 1/2006 |
| CN | 101 002 587 | 7/2007 |
| CN | 101 044 878 | 10/2007 |
| CN | 101 385 491 | 3/2009 |
| CN | 101 491 281 | 7/2009 |
| EP | 0 167 399 | 1/1986 |
| EP | 1 013 261 | 6/2000 |
| EP | 1 062 941 | 12/2000 |
| GB | 593 260 | 10/1947 |
| GB | 893 551 | 4/1963 |
| GB | 968 423 | 9/1964 |
| GB | 1 284 721 | 8/1972 |
| GB | 1 329 612 | 9/1973 |
| GB | 11 310 | 5/2011 |
| IN | 195 073 | 2/2001 |
| IN | 195073 | * 12/2004 |
| JP | 02 184626 | 7/1990 |
| JP | 05/211838 | 8/1993 |
| JP | 07/203849 | 8/1995 |
| JP | 09 275 903 | 10/1997 |
| JP | 9-275903 | * 10/1997 |
| JP | 10/165095 | 6/1998 |
| JP | 10/304822 | 11/1998 |
| JP | 11/009188 | 1/1999 |
| JP | 11 056 243 | 3/1999 |
| JP | 11/346654 | 12/1999 |
| JP | 2000/125824 | 5/2000 |
| JP | 2003/111558 | 4/2003 |
| JP | 2003/125705 | 5/2003 |
| JP | 2003/164261 | 6/2003 |
| JP | 2004/041237 | 2/2004 |
| JP | 2004/089146 | 3/2004 |
| JP | 2006/136270 | 6/2006 |
| JP | 2007/082526 | 4/2007 |
| KR | 1994-0000775 | 8/1992 |
| KR | 10 2009 0009042 | 1/2009 |
| SU | 326 797 | 12/1972 |
| SU | 929 041 | 5/1982 |
| SU | 1 153 873 | 5/1985 |
| WO | 97/20686 | 6/1997 |
| WO | 98/23164 | 6/1998 |
| WO | 99/40799 | 8/1999 |
| WO | 00/47056 | 8/2000 |

(Continued)

OTHER PUBLICATIONS

PCT International Search Report in a PCT application PCT/EP2008/064717.
PCT international Search Report in a PCT application PCT/EP2009/062670.
PCT Internatiranal search Report in a PCT application PCT/EP2009/062671.
European Search Report in an EP application EP 08 17 2695.
European Search Report in an EP application EP 08 17 2696.
Co-pending Application: Applicant: Colliver et al., U.S. Appl. No. 12/569,923, filed Sep. 30, 2009.
Co-pending Application: Applicant: Colliver et al., U.S. Appl. No. 12/569,924, filed Sep. 30, 2009.
PCT International Search Report in a PCT application PCT/EP2008/064713, Aug. 12, 2008.

(Continued)

*Primary Examiner* — Anthony Weier
(74) *Attorney, Agent, or Firm* — Ellen Plotkin (57) ABSTRACT

Shown is a process having the steps of: expressing juice from fresh tea leaves thereby to produce leaf residue and tea juice, wherein the amount of expressed juice is between 10 and 300 ml per kg of the fresh tea leaves; and processing the leaf residue to produce leaf tea and/or a tea extract.

14 Claims, 3 Drawing Sheets

FOREIGN PATENT DOCUMENTS

| WO | 01/82713 | 11/2001 |
|---|---|---|
| WO | 02/069727 | 9/2002 |
| WO | 03/022066 | 3/2003 |
| WO | 03/101215 | 12/2003 |
| WO | 2004/002235 | 1/2004 |
| WO | 2004/008869 | 1/2004 |
| WO | WO2005020700 | 3/2005 |
| WO | 2005/072532 | 8/2005 |
| WO | 2006/012238 | 2/2006 |
| WO | 2006/021317 | 3/2006 |
| WO | 2006/037503 | 4/2006 |
| WO | 2006/037504 | 4/2006 |
| WO | 2006/037511 | 4/2006 |
| WO | 2007/079900 | 7/2007 |
| WO | 2008/001848 | 1/2008 |
| WO | 2008/012280 | 1/2008 |
| WO | 2008/04067 | 4/2008 |
| WO | 2008/065007 | 6/2008 |
| WO | 2008/138706 | 11/2008 |

OTHER PUBLICATIONS

European Search Report in an EP application EP 07 11 9988, Jun. 4, 2008.
European Search Report in an EP application EP 07 11 9984, Jan. 3, 2008.
PCT International Search Report in a PCT application PCT/EP2008/064714, Nov. 12, 2008.
European Search Report in an EP application EP 08 15 1155, Jul. 16, 2008.
PCT International Search Report in a PCT application PCT/EP2008/064716.
Derwent Abstract of WO2008/001848 published Jan. 3, 2008.
Abstract of CN 1 058 135—published Jan. 29, 1992 with full text translation.
Abstract of CN 1 059 078—published Mar. 4, 1992.
Abstract of CN 1 640 282—published Jul. 20, 2005.
Abstract of KR 940004838—published Jun. 2, 1994.
Japanese Abstract 02-203746—published Aug. 13, 1990.
Japanese Abstract 05-292883—published Nov. 9, 1993.
Japanese Abstract 10-099021—published Apr. 21, 1998.
Japanese Abstract 10 101624—published Apr. 21, 1998.
Japanese Abstract 11-056243—published Feb. 2, 1999.
Japanese Abstract 2002-272369—published Sep. 24, 2002.
Japanese Abstract 2003-061581—published Mar. 4, 2003.
Japanese Abstract 2003-225054—published Aug. 12, 2003.
Japanese Abstract 2006-131512 published May 25, 2006.
Japanese Abstract 2006-206483 published Aug. 10, 2006.
Li et al., "*Current Research and Developments in the Processing of Green Tea Fresh Juice*" China Tea Processing, 2005, (2), pp. 23-24 and 29.
Sinija et al. "*Process technology for production of soluble tea powder*", Journal of Food Engineering, 82 (2007), pp. 276-283.
Nagao et al., "*Tea Catechins Suppress Accumulation of Body Fat in Humans*" J. Oleo Science, 50, (2001), pp. 717-728.
Peters et al., "*Does Tea Affect Cardiovascular Disease? A Meta-Analysis*", American Journal of Epidemiology, (2001), vol. 154, No. 6, pp. 495-503.
www.pref.kyoto.jp/chaken/ekisu.html, "*The development of the tea extract powder*", at least before Oct. 2007.
Zhang et al., "*Reverse Osmosis Transport and Module analysis for Green Tea Juice Concentration*", Journal of Food Process Engineering, 1993, 16 (1), pp. 1-20).
Willson et al., "Tea Cultivation to consumption", 1st Edition, 1992, Chapter 13 (pp. 412-457), Chapter 14 (pp. 459-511); Chapter 16 (pp. 535-554), Chapter 17 (pp. 555-601).
"*Determination of substances characteristic of green and black tea*" International Standard, ISO 14502-1, First Edition, May 1, 2005.
Wenli et al., "*Quality comparison of Fresh Green Tea Juice and green tea liquor*", Journal of Tea. (2003), 29(4) 215-216 (English Abstract attached).
Wenli et al., "*Research on the quality and processing technique of the fresh areen tea juice*".
Co-pending Application: Applicant: Colliver et al., U.S. Appl. No. 12/290,860, filed Nov. 4, 2008.
Co-pending Application: Applicant: Colliver et al., U.S. Appl. No. 12/290,859, filed Nov. 4, 2008.
Co-pending Application: Applicant: Colliver et al., U.S. Appl. No. 12/290,858, filed Nov. 4, 2008.
Co-pending Application: Applicant: Colliver et al., U.S. Appl. No. 12/290,857, filed Nov. 4, 2008.
PCT International Search Report in a PCT application PCT/EP2008/064720.
Co-pending Application: Applicant: Colliver et al., U.S. Appl. No. 12/322,410, filed Feb. 2, 2009.
PCT International Search Report in a PCT application PCT/EP2009/051271.

\* cited by examiner

PROCESS FOR MANUFACTURING TEA PRODUCTS

TECHNICAL FIELD OF THE INVENTION

The present invention relates to a process for manufacturing tea products. More particularly the present invention relates to a process which allows for the simultaneous manufacture of tea juice and leaf tea and/or tea extract.

BACKGROUND TO THE INVENTION

Beverages based on the tea plant (*Camellia sinensis*) have been popular throughout the world for many hundreds of years. Traditionally such beverages are produced by infusing leaf tea in hot water.

Although many consumers still enjoy beverages made from leaf tea, it is becoming increasingly popular to enjoy tea beverages prepared in more convenient ways. For example, tea beverages can be prepared from instant powders which are free from insoluble leaf tea and so dissolve rapidly and completely on contact with hot water. These powder products are usually manufactured by a process comprising extracting leaf tea with water and drying the resulting extract. Also popular are packaged ready-to-drink beverages which contain dissolved tea solids. Such ready-to-drink teas are usually manufactured from instant powders such as those described above or directly from extraction of tea leaf.

Consumers are also increasingly interested in foods and beverages which have undergone minimal processing and have a natural image and/or contain high levels of bioactive compounds. In view of this, efforts have been made to manufacture tea powders or ready-to-drink beverages from juice expressed from tea leaves as an alternative to tea extracts.

CN 1 718 030 A (LANCANGJIANG BEER ENTPR GROUP) discloses a green tea beverage prepared from fresh organic green tea leaves through breaking, squeezing to obtain tea juice, filtering, fine filtering by membrane, mixing it with water in ratio of 1:(15-25), membrane filtering for removing bacteria, and aseptic canning.

JP 11/056,243 A (NARA PREFECTURE) discloses a method for producing a powdery tea product containing increased amount of effective component and capable of keeping flavour, etc., over a long period by subjecting a pressed juice obtained by the successive steaming, grinding and pressing of raw tea leaves to ultrafiltration and reverse osmosis concentration treatment, adding a cyclodextrin to the concentrated liquid and drying the mixture.

Unfortunately, tea products made from tea juice have not yet enjoyed commercial success. This may be due, in part, to high wastage due to loss of tea material in the pressed leaf. As disclosed in JP 11/056,243 A, the tea leaves from these known processes still contain some effective components but are unable to be used as they are. Thus, it is suggested in JP 11/056,243 A to process the squeezed leaves into a fine powder and recombine with the powdered tea juice. Unfortunately, however, products which contain powdered insoluble tea leaf are only of limited popularity with consumers.

Therefore, we have identified that there is a need for a process for preparing tea products derived from tea juice, wherein the pressed tea leaves are not wasted but are used to manufacture tea products which retain the high value of traditional leaf tea (especially large leaf tea) or tea extracts. We have found that this need can be met by carefully controlling the way in which the juice is expressed such that the leaves are suitable for manufacture into tea products with a quality at least comparable to that of conventional tea products.

DEFINITIONS

Tea

"Tea" for the purposes of the present invention means material from *Camellia sinensis* var. *sinensis* and/or *Camellia sinensis* var. *assamica*. Especially preferred is material from var. *assamica* as this has a higher level of tea actives than var. *sinensis*.

"Leaf tea" for the purposes of this invention means a tea product that contains tea leaves and/or stem in an uninfused form, and that has been dried to a moisture content of less than 30% by weight, and usually has a water content in the range 1 to 10% by weight (i.e. "made tea").

"Green tea" refers to substantially unfermented tea. "Black tea" refers to substantially fermented tea. "Oolong tea" refers to partially fermented tea.

"Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances.

"Fresh tea leaves" refers to tea leaves and/or stem that have never been dried to a water content of less than 30% by weight, and usually have a water content in the range 60 to 90%.

Expressing Juice

As used herein the term "expressing juice" refers to squeezing out juice from fresh tea leaves using physical force, as opposed to extraction of tea solids with the use of a solvent. Thus the term "expressing" encompasses such means as squeezing, pressing, wringing, spinning and extruding. It is possible that a small amount of solvent (e.g. water) is added to the fresh leaves during the expression step. However, in order to prevent significant extraction of tea solids by the solvent, the moisture content of the leaves during expression is that of fresh tea leaves as defined hereinabove. In other words, during the expression step, the moisture content of the tea leaves is between 30 and 90% by weight, more preferably between 60 and 90%. It is also preferred that the fresh leaves are not contacted with non-aqueous solvent (e.g. alcohols) prior to or during expression, owing to the environmental & economic problems associated with such solvents.

Beverage

As used herein the term "beverage" refers to a substantially aqueous drinkable composition suitable for human consumption.

Leaf Size and Grade

For the purposes of the present invention, leaf particle size is characterised by sieve mesh size using the following convention:

Tyler mesh sizes are used throughout.

A "+" before the sieve mesh indicates the particles are retained by the sieve.

A "−" before the sieve mesh indicates the particles pass through the sieve.

For example, if the particle size is described as −5 +20 mesh, then the particles will pass through a 5 mesh sieve (particles smaller than 4.0 mm) and be retained by a 20 mesh sieve (particles larger than 841 µm).

Leaf particle size may additionally or alternatively be characterized using the grades listed in the international standard ISO 6078-1982. These grades are discussed in detail in our European patent specification EP 1 365 657 B1 (especially paragraph [0041] and Table 2) which is hereby incorporated by reference.

SUMMARY OF THE INVENTION

We have surprisingly found that tea leaves from which juice has been expressed can be processed to make leaf tea of conventional quality despite the fact that the leaf residue after expression has a lower overall level of tea compounds such as polyphenols and amino acids. In order to achieve the required quality we have found it necessary to control the degree of damage to the leaves during the expression step. We have found that the amount of juice expressed is a convenient measure of the degree of damage. Thus we have found that if the amount of expressed juice is less than 300 ml per kg of the fresh tea leaves then leaf tea of at least conventional quality can be obtained. However, if the amount of juice expressed is too low then it becomes difficult to separate the juice from the leaf residue and/or leads to an inefficient process. Furthermore, we have found that the leaf residue is particularly convenient for producing tea extracts.

Thus in a first aspect, the present invention provides a process comprising the steps of:
a) expressing juice from fresh tea leaves thereby to produce leaf residue and tea juice, wherein the amount of expressed juice is between 10 and 300 ml per kg of the fresh tea leaves; and
b) processing the leaf residue to produce leaf tea and/or extracting the leaf residue with a solvent to produce a tea extract.

Without wishing to be bound by theory, we believe that the damage caused by the expression process changes the morphology/microstructure of the leaf such that although the leaf residue has a reduced total level of infusible solids, the solids more easily infuse from the leaf into an infusion liquor. This results in the composition of the liquor being similar to that from conventional leaf which has a higher total level of infusible solids but which releases them more slowly. Therefore we believe that the leaf tea produced by the process of the invention will be characterised by the combination of a morphology and microstructure resulting from the expression process and a low level of total infusible solids. Furthermore, the damage brought about from the expression step allows for a more efficient extraction process, wherein extracts comparable to those conventionally used for making tea concentrates and powders can be produced but with shorter extraction times and/or milder extraction conditions. By "milder extraction conditions" is meant more environmentally friendly solvents and/or lower temperatures, for example.

In a second aspect, the present invention provides a leaf tea obtainable and/or obtained by the process of the first aspect.

A particular advantage of the leaf tea of the invention over conventional leaf tea may be that it is more convenient because it does not require the consumer to accurately monitor the infusion time to achieve the required brew strength. This is because the lower overall level of infusible substances means that it is much less likely that the infusion will be over-brewed (or "stewed") even if the leaf tea is left in contact with the infusion liquid for a long time.

BRIEF DESCRIPTION OF THE DRAWINGS

The invention will be described with reference to the accompanying drawings in which.

DETAILED DESCRIPTION

Expression of Juice

Step (a) of the process of the invention comprises expressing juice from fresh tea leaves thereby to produce leaf residue and tea juice, wherein the amount of expressed juice is between 10 and 300 ml per kg of the fresh tea leaves.

It is particularly preferred that the fresh tea leaves comprise material from var. *assamica* as this variety naturally has a high level of tea actives and so leads to a high level of actives in the leaf residue even after removal of the juice. Most preferably the fresh leaves are fresh leaves from var. *assamica*.

In general, the quality of the final leaf tea (e.g. in terms of infusion performance) is better the less juice expressed. Additionally or alternatively, it is found that the forces required to express high levels of juice disintegrate the leaf to such an extent that the proportion of "off grades" (such as dust) in the final leaf tea are increased. Thus it is preferred that the amount of juice expressed in step (a) is less than 275 ml per kg of tea leaves, more preferably less than 250 ml and most preferably less than 225 ml. It is also preferred, however that the amount of expressed juice is at least 25 ml per kg of the fresh tea leaves, more preferably at least 50 ml and most preferably at least 75 ml. When referring to the volume of juice expressed per unit mass of tea leaves it should be noted that the mass of the tea leaves is expressed on an "as is" basis and not a dry weight basis. Thus the mass includes any moisture in the leaves.

The expression step can be achieved in any convenient way so long as it allows for separation of the tea juice from the leaf residue and results in the required quantity of juice. The machinery used to express the juice may, for example, include a hydraulic press, a pneumatic press, a screw press, a belt press, an extruder or a combination thereof.

The juice may be obtained from the fresh leaves in a single pressing or in multiple pressings of the fresh leaves. Preferably the juice is obtained from a single pressing as this allows for a simple and rapid process.

In order to minimise generation of off-flavours in the leaf tea and/or juice, it is preferred that the expression step is performed at ambient temperature. For example, the leaf temperature may be from 5 to 40° C., more preferably 10 to 30° C.

The time and pressure used in the expression step can be varied to yield the specified amount of juice. Typically, however, the pressures applied to express the juice will range from 0.5 MPa (73 psi) to 10 MPa (1450 psi). The time over which the pressure is applied will typically range from 1 s to 1 hour, more preferably from 10 s to 20 minutes and most preferably from 30 s to 5 minutes.

Prior to expression, the fresh tea leaves may undergo a pre-treatment including, for example, a unit process selected from heat treatment to deactivate fermentation enzymes, maceration, withering, fermentation or a combination thereof.

If the tea juice and/or leaf residue is to be used to produce a green tea product it is preferred that the fresh leaves are heat treated to deactivate fermentation enzymes prior to expression. Suitable heat treatments include steaming and/or pan-frying.

If the tea juice and/or leaf residue is to be used to produce a black or oolong tea product it is preferred that the fresh leaves are not heat treated to deactivate fermentation enzymes prior to expression. The fresh leaves may or may not be fermented prior to expression. If the leaves are fermented prior to expression then it is particularly preferred that they are macerated prior to fermentation.

Whether or not the fresh leaves are fermented, maceration prior to expression may help in decreasing the time and/or pressure required to express the specified quantity of juice.

Processing the Juice

Tea juice separated from the leaf residue typically has a high content of water-soluble tea solids and is a valuable raw material for producing tea products.

The juice may be used to produce a green tea product, an oolong tea product or a black tea product. In the case of an oolong tea product or a black tea product then the juice is preferably expressed from at least partially fermented leaf in step (a) and/or the juice is subjected to a fermentation step after expression. In the case of a green tea product, the fresh leaves are not fermented before expression and the juice is not fermented after expression. It is possible that the juice is unfermented (e.g. by treating to deactivate the enzymes immediately following expression) whilst the leaf residue is fermented to make black leaf tea or oolong leaf tea. Alternatively, the juice may be fermented following expression whilst the leaf residue is heat-treated to deactivate the fermentation enzymes and processed to a green leaf tea.

Diluting to Make a Beverage

In one embodiment the tea juice is diluted to produce a beverage. A suitable process is described, for example, in CN 1 718 030 A (LANCANGJIANG BEER ENTPR GROUP).

The juice is preferably diluted with an aqueous medium, preferably water. The beverage typically comprises at least 85% water, more preferably at least 90%, optimally between 95 and 99.9% by weight of the beverage.

Because the juice is relatively rich in tea solids, it can be diluted many-fold whilst still imparting tea-qualities to the resulting beverage. Preferably, therefore, the juice is diluted by at least a factor of 2 to produce the beverage (i.e. 1 part of juice is combined with 1 part diluent by weight). More preferably the juice is diluted by a factor of at least 5 (i.e. 1 part of juice is combined with 4 parts diluent by weight) and most preferably by a factor of at least 7.

The juice can be used to make concentrated beverages with high levels of tea solids. For example, the juice may be diluted by a factor of less than 50, more preferably less than 25 and most preferably less than 15.

The mass of a single serve of the beverage may be, for example, less than 600 g, more preferably less than 350 g, more preferably still less than 250 g and most preferably from 20 to 150 g.

The pH of the beverage may, for example, be from 2.5 to 8, more preferably 3 to 6, most preferably from 3.5 to 6. The beverage may comprise a food grade acid and/or salt thereof such as citric, malic, ascorbic acid or a mixture thereof.

The beverage preferably comprises at least one nutrient selected from carbohydrate, protein, fat, vitamins, minerals and mixtures thereof. The beverage may be low calorie (e.g. have an energy content of less than 100 kCal per 100 g of the beverage) or may have a high calorie content (e.g. have an energy content of more than 100 kCal per 100 g of the beverage, preferably between 150 and 1000 kCal). It is most preferred that the beverage is very low calorie such that a single serving has a total energy content of less than 5 kCal, more preferably still less than 1 kCal.

The beverage may also comprise any of salt, sweetener, flavours, colours, preservatives, antioxidants or a mixture thereof.

The beverage is preferably packaged. The package will typically be a bottle, can, carton or pouch.

The beverage is preferably sanitised e.g. by pasteurisation or sterilisation.

Drying the Juice

In one embodiment the tea juice is dried to produce a liquid concentrate or powder. Preferably the juice is dried to a moisture content of less than 80% by weight, more preferably less than 50% by weight, more preferably still less than 30% by weight and most preferably less than 10% by weight. Any suitable drying process may be used including spray drying, freeze drying, oven drying, tray drying, vacuum drying or a combination thereof.

The concentrate or powder may, for example, be diluted or dissolved to produce a beverage, used as a food additive and/or used as a starting material for producing other tea-derived materials.

Processing the Leaf Residue

Step (b) of the process of the invention comprises processing the leaf residue to produce leaf tea and/or tea extract. The leaf tea and/or extract is of a quality comparable to that of conventional leaf teas or extracts even though it has been produced from leaf residue which has had the juice removed therefrom. Thus the leaf residue is processed separately from the tea juice. In particular the expressed tea juice is not contacted with the leaf residue during manufacture of the leaf tea and/or tea extract.

Leaf Tea Production

The leaf residue may be processed to produce green leaf tea, black leaf tea or oolong leaf tea. In the case of oolong leaf tea and black leaf tea step (b) comprises fermenting the leaf residue.

The manufacturing processes of green leaf tea, black leaf tea and oolong leaf tea are well known and suitable processes are described, for example, in "Tea: Cultivation to Consumption", K. C. Willson and M. N. Clifford (Eds), $1^{st}$ Edn, 1992, Chapman & Hall (London), Chapters 13 and 14.

A step common to manufacture of all leaf teas is a drying step. In the case of oolong and black leaf tea, the drying step usually also serves to deactivate the fermentation enzymes. Efficient drying requires high temperatures and so it is preferred that step (b) of the process comprises drying the leaf residue at a temperature of at least 75° C., more preferably at least 90° C.

The leaf tea produced by the process of the present invention has good infusion performance even at leaf particle sizes comparable to those of conventional leaf teas. Furthermore, leaf tea made from the residue obtained by pressing too high amounts of juice has a relatively low yield of large leaf grades. Thus it is preferred that the process comprises sorting the leaf tea, preferably after drying, to achieve a particle size of at least 35 mesh. More preferably the leaf tea is sorted to achieve a particle size of from 30 mesh to 3 mesh. Alternatively or additionally, the leaf tea may be sorted to achieve a leaf tea grade of Pekoe Fannings (PF) grade or larger, more preferably Orange Fannings (OF) or larger and most preferably Broken Orange Pekoe Fannings (BOPF) or larger.

Tea Extract Production

Although the leaf residue may be extracted with the solvent prior to drying of the leaf residue, in an especially preferred embodiment the extract is produced from made tea. Thus it is preferred that step (b) comprises processing the leaf residue to produce leaf tea and then extracting the leaf tea with a solvent to produce a tea extract.

The most preferred solvent for use in step (b) is an aqueous solvent. Preferably the aqueous solvent comprises at least 50% water by weight of the solvent, more preferably at least 90% and most preferably from 99 to 100%.

The solvent may be cold and have a temperature, for example, in the range of from 1 to 50° C. It is most preferred, however, that the solvent is hot as hot solvents tend to be more efficient at extracting tea solids. Thus it is preferred that the solvent temperature in step (b) is greater than 50° C., more preferably at least 70° C. and most preferably from 80 to 100° C.

Preferably the solvent is contacted with the leaf residue in step (b) for a time of at least 1 minute. However, because the leaf residue has a good rate of infusion, it is preferred that the solvent is contacted with the leaf residue in step (b) for a time of less than 1 hour, more preferably less than 30 minutes and most preferably less than 15 minutes.

The leaf residue and solvent are preferably contacted in step (b) in a weight ratio in the range of 1:1 to 1:1000, more preferably from 1:4 to 1:100 and most preferably from 1:6 to 1:20.

Following contact of leaf residue with solvent, the leaf residue is usually separated from the liquid extract. Thus in a preferred embodiment, step (b) comprises de-leafing the extract. This de-leafing step can readily be achieved, for example, by filtering and/or centrifuging the extract.

In a most preferred embodiment, step (b) comprises removing at least some of the solvent from the extract to produce a concentrated tea extract. Where the solvent is aqueous this will involve drying the extract. The concentrated tea extract may be a liquid concentrate or a solid concentrate, such as a powder. Most preferred is that the tea extract is dried to a powder in step (b). Where the concentrated extract is a liquid, it will usually have a moisture content in the range of from 40 to 95% by weight. Where the concentrated extract is a solid concentrate it will typically have a moisture content of less than 30% by weight, more preferably from 1 to 10% by weight.

In a most preferred embodiment the tea extract is processed to produce an instant tea powder. Suitable processes include those described, for example, in Chapter 16 of "Tea: Cultivation to Consumption", K. C. Willson and M. N. Clifford (Eds), 1$^{st}$ Edn, 1992, Chapman & Hall (London).

The Leaf Tea

The leaf tea produced by the process of the invention is characterised by the combination of a morphology and microstructure resulting from the expression process and a lower level of overall infusible solids than leaf tea made without expressing juice. For example, where the leaf tea is black leaf tea, it will typically have a total polyphenol content of less than 25% by dry weight of the leaf tea, more preferably less than 22% and most preferably less than 20%. Where the leaf tea is green leaf tea, it will typically have a total polyphenol content of less than 28% by dry weight of the leaf tea, more preferably less than 26% and most preferably less than 25%. Owing to the specified amount of expressed juice, however, the total polyphenol content of the leaf tea (whether green or black) is typically greater than 10% by dry weight of the leaf tea, more preferably at least 14% and most preferably at least 18%. The total polyphenol content of the leaf tea is especially high when the tea comprises material from *Camellia sinensis* var. *assamica*. The total polyphenol content of leaf tea can be determined using the Folin-Ciocalteu method as detailed in the draft International Standard published by the International Organization for Standardization as ISO/CD 14502-1: 2005 with a corrigendum published as ISO 14502-1:2005/ Cor.1:2006.

The leaf tea may be black leaf tea, green leaf tea or oolong leaf tea.

In order that the leaf tea most closely resembles conventional leaf tea it is preferred that at least 90% by weight of the leaf tea has a particle size above 35 mesh. More preferably at least 90% by weight of the leaf tea has a particle size of from 30 mesh to 3 mesh. Alternatively or additionally, the leaf tea may be of Pekoe Fanings (PF) grade or larger, more preferably Orange Fannings (OF) or larger and most preferably Broken Orange Pekoe Fannings (BOPF) or larger.

In one embodiment, the leaf tea is packaged in an infusion package. As used herein, the term "infusion package" means a package comprising porous material. The porous material can be any material that is suitable for enabling water to infuse within the package without allowing any insoluble contents to leave the package, for example filter paper, nylon mesh, gauze, muslin, nonwoven fabric or some other similar material or fabric. Such infusion packages are well-known for use with leaf tea and include tea bags and tea pods.

EXAMPLES

The present invention will be further described with reference to the following examples.

Example 1

This Example demonstrates the processing of fresh leaf to produce black leaf tea and black tea juice.

Production of Juice

Fresh tea leaves (which had not been withered) were chopped using a vegetable cutter before being fed through a CTC (cut, tear, curl) machine (Rollers set at six teeth per inch with speeds of 1000 and 100 rpm respectively). The fresh dhool (with an average chopped leaf size of around 0.5 to 1 cm$^2$) was then fermented for 2 hours using a Teacraft™ fermentation unit (0.5° C. wet bulb depression, 90% R.H.) to a moisture content of 68%.

Fermented dhool was then pressed using a hydraulic press (5 Tonnes applied to a 500 g mass of fermented leaf inside a cylinder of diameter 160 mm, resulting in a downward pressure of 354 psi (2.44 MPa)) to express black tea juice. The yield of black tea juice was 25 ml/100 g fermented dhool, and had a total solids content of 8% by weight. The tea juice was immediately centrifuged for 20 minutes (10000 g at 3° C.) and the supernatant was then filter sterilised using a Nalgene™ filtration unit fitted with a 0.2 µm filter. The solids content of the tea juice after centrifugation and filtration was 6% by weight, and was found to be rich in tea actives including catechins, theaflavin, theanine and caffeine. Examples of levels of tea actives in black tea juice are shown in table 1.

TABLE 1

| Tea active | Level in Black Juice (µg ml$^{-1}$) |
|---|---|
| Catechins | 0 |
| Theaflavins | 330 |
| Theanine | 2040 |
| Caffeine | 1465 |

Production of Leaf Tea

The pressed residual dhool resulting from the juice production above was broken up by hand and then dried using a fluidized bed drier (ten minutes at 90° C., followed by ten minutes at 120° C.) to obtain a made black tea with moisture content of 3% by weight.

The dried fermented dhool was used to make a high quality black tea infusion by infusing in freshly-boiled water (2 minutes at 1% w/v and without agitation). The colour profile of the infusion was measured, and found to be comparable to a control black leaf tea made using the above process but with the pressing step omitted. Further similarities between the infusion made from pressed dried residual dhool and control black leaf tea were apparent following quantification of the non-volatile tea components. The details shown in table 2 illustrate the comparable non-volatile profiles between the two, indicative of a good quality infusion despite being made from juice-extracted (i.e. pressed) dhool.

TABLE 2

| Tea component | Concentration in infusion of tea from residual dhool ($\mu g\ ml^{-1}$) | Concentration in control black tea infusion ($\mu g\ ml^{-1}$) |
| --- | --- | --- |
| Catechins | 115 | 123 |
| Theaflavins | 57 | 51 |
| Theanine | 33 | 46 |
| Caffeine | 314 | 304 |

Processing of Tea Juice

The expressed black tea juice described above is a useful raw material for the production of freeze dried powders enriched in tea actives. As stated, the black tea juice has a total solids content of 6% post filtration, and this juice can be freeze dried to produce a powder of composition shown in table 3. The complete tea juice (i.e. freeze dried with no fractionation) produced a theanine-enriched powder suitable as a base for ready-to-drink beverages or as a supply of actives in other products.

TABLE 3

| Tea component | Level in powder ($mg\ g^{-1}$ dry weight) |
| --- | --- |
| Catechins | 0 |
| Theaflavins | 5 |
| Theanine | 33 |
| Caffeine | 23 |

Example 2

This Example demonstrates the processing of fresh leaf to produce green leaf tea and green tea juice.

Production of Juice

Fresh tea leaves (which had not been withered) were steamed for 60 seconds at ~100° C. to inactivate endogenous enzymes and thus prevent fermentation. Steamed leaves, cooled to room temperature, were chopped using a vegetable cutter to yield chopped leaf of average size of around 0.5 to 1 cm². The dhool was then pressed using a hydraulic press (5 Tonnes applied to a 500 g mass of leaf inside a cylinder of diameter 160 mm, resulting in a downward pressure of 354 psi (2.44 MPa)) to express green tea juice. The yield of green tea juice was 22 ml/100 g dhool, and had a total solids content of 8% by weight. The tea juice was immediately centrifuged for 20 minutes (10000 g at 3° C.) and the supernatant was then filter-sterilised using a Nalgene™ filtration unit fitted with a 0.2 μm filter. The solids content of the tea juice after centrifugation and filtration was 6% by weight, and was found to be rich in tea actives including catechins and theanine. The green tea juice composition is shown in table 4.

TABLE 4

| Tea component | Level in Green Juice ($\mu g\ ml^{-1}$) |
| --- | --- |
| Catechins | 22520 |
| Theaflavins | 0 |
| Theanine | 1660 |
| Caffeine | 4030 |

Processing of Tea Juice

Expressed green tea juice was freeze dried to produce a powder which may find utility in ready-to-drink applications or as an ingredient (source of tea actives) for a variety of other products. Table 5 shows the composition of powder obtained by freeze drying green tea juice, demonstrating a means of producing theanine-enriched powders from green tea juice.

TABLE 5

| Tea component | Level in powder ($mg\ g^{-1}$ dry weight) |
| --- | --- |
| Catechin | 254 |
| Theaflavins | 0 |
| Theanine | 20 |
| Caffeine | 48 |

Production of Leaf Tea

The pressed residual dhool resulting from the green juice production above was broken up by hand and then dried using a fluidized bed drier (ten minutes at 90° C., followed by ten minutes at 120° C.) to obtain a made green tea with moisture content of 3%.

The made green tea derived from residual dhool was used to make a green tea infusion by infusing in freshly-boiled water (2 minutes at 1% w/v and without agitation). A control green tea was prepared in the same way, using material which had been through the above process but without the pressing step. The colour profile of the infusion was measured, and found to be comparable to the control green leaf. A summary of some non-volatile components is shown in table 6.

TABLE 6

| Tea component | Concentration in infusion of tea from residual dhool ($\mu g\ ml^{-1}$) | Concentration in control green tea infusion ($\mu g\ ml^{-1}$) |
| --- | --- | --- |
| Catechins | 468 | 536 |
| Theaflavins | 0 | 0 |
| Theanine | 20 | 26 |
| Caffeine | 201 | 232 |

Example 3

This Example demonstrates the effect of the process of the invention on the total polyphenol content of leaf teas produced thereby.

A black leaf tea was produced from fresh tea leaves from Kenyan tea of *Camellia sinensis* var. *assamica* using the same process as described in Example 1. A green leaf tea was produced from fresh tea leaves from Kenyan tea of *Camellia sinensis* var. *assamica* using the same process as described in Example 2. Control leaf teas were made from the same Kenyan tea of *Camellia sinensis* var. *assamica* but without expressing juice from the fresh tea leaves.

The total polyphenol contents of the resulting teas are shown in Table 7 (determined using the method set out in International Standard ISO 14502-1:2005(E)).

TABLE 7

| Leaf Tea | Total Polyphenols (% dry weight) |
|---|---|
| Black | 19.1 |
| Control Black | 19.5 |
| Green | 24.5 |
| Control Green | 24.9 |

As can be seen from the data in Table 7, the leaf teas of the present invention have a reduced total polyphenol content compared with the equivalent control leaf teas but still have an acceptable level of polyphenols.

Example 4

This Example demonstrates the effect of the amount of juice expressed on leaf microstructure and grade.

Production of Juice

Fresh Kenyan tea leaves (which had not been withered and had a catechin content of around 15% by dry weight) of *Camellia Sinensis* var. *assamica* were steamed for 60 seconds at ~100° C. to inactivate endogenous enzymes and thus prevent fermentation. Steamed leaves, cooled to room temperature, were chopped using a vegetable cutter to yield chopped leaf of average size of around 0.5 to 1 cm$^2$.

The dhool was then separated into three batches—A, B and C.

The dhool of batch A was pressed using a hydraulic press (5 Tonnes applied to a 500 g mass of leaf inside a cylinder of diameter 160 mm, resulting in a downward pressure of 354 psi (2.44 MPa)) to express green tea juice. The yield of green tea juice was 24 ml/100 g dhool.

The dhool of batch B was pressed using a screw press (Vincent horizontal continuous press model CP4, Vincent Corp., Tampa, Fla., USA) operating with a back-pressure of 80 psi (0.55 MPa). The resulting yield of juice was 50 ml/100 g dhool.

The Dhool of batch C was not pressed.

Processing of Tea Juice

Expressed green tea juice was freeze dried to produce a powder which may find utility in ready-to-drink applications or as an ingredient (source of tea actives) for a variety of other products.

Production of Leaf Tea

The three batches of dhool were each broken up by hand and then dried using a fluidized bed drier (ten minutes at an inlet air temperature of 120° C., followed by ten minutes at an inlet air temperature of 90° C.) to obtain three batches of green leaf tea each with a moisture content of less than 9% by weight.

Grade Profile of the Leaf Teas

The particle size distribution (grade profile) of each batch of leaf tea was determined by sieving through a series of increasingly narrow screens. The results are shown in Table 8.

TABLE 8

| | Amount of leaf in each grade (wt %) | | | | | |
|---|---|---|---|---|---|---|
| Batch | +5 Mesh | −5 +10 Mesh | −10 +14 Mesh | −14 +24 Mesh | −24 +40 Mesh | −40 Mesh |
| A | 0.43 | 66.77 | 19.08 | 11.80 | 1.80 | 0.76 |
| B | 0.06 | 40.62 | 19.09 | 22.32 | 10.81 | 7.37 |
| C | 0.21 | 63.33 | 21.82 | 12.73 | 1.50 | 0.74 |

The grade profile of batch A (240 ml juice expressed per kg of fresh leaves) appears very similar to that of batch C (unpressed). The grade profile of batch B (500 ml juice expressed per kg of fresh leaves), however, is shifted to smaller particle sizes (higher mesh numbers) and lower grades.

Microstructure of the Leaf Teas

Samples of tea leaf were fixed in 2.5% glutaraldehyde in 0.1 M sodium cacodylate buffer for 3.5 hours. They were then washed in 3 changes of 0.1 M sodium cacodylate buffer (2×1 hour and the final change overnight). Secondary fixation was performed using 1% osmium tetroxide for 3 hours followed by 3×1 hour changes of distilled water. The samples were then overnight in 1% aqueous uranyl acetate before dehydration in a graded series of aqueous ethanol solutions (70%, 90%, 100%, 100% and 1005 ethanol) for 1 hours at each level. This was followed by 2×1 hour changes in acetone before transferring the samples into 50/50 resin/acetone mixture overnight. The samples were then transferred into 100% resin mix for 24 hours before embedding the samples into fresh resin and polymerising at 60 degrees C. for 48 hours. 90-110 nm ultrathin sections were cut using a Reichert UltraCut E ultra-microtome before examination of the sections on a JEOL 2100 transmission electron microscope operating at 200 kV. Representative micrographs were taken using a GATAN ultrascan 4K camera and these images captured on Digital Micrograph software.

Figure 1:
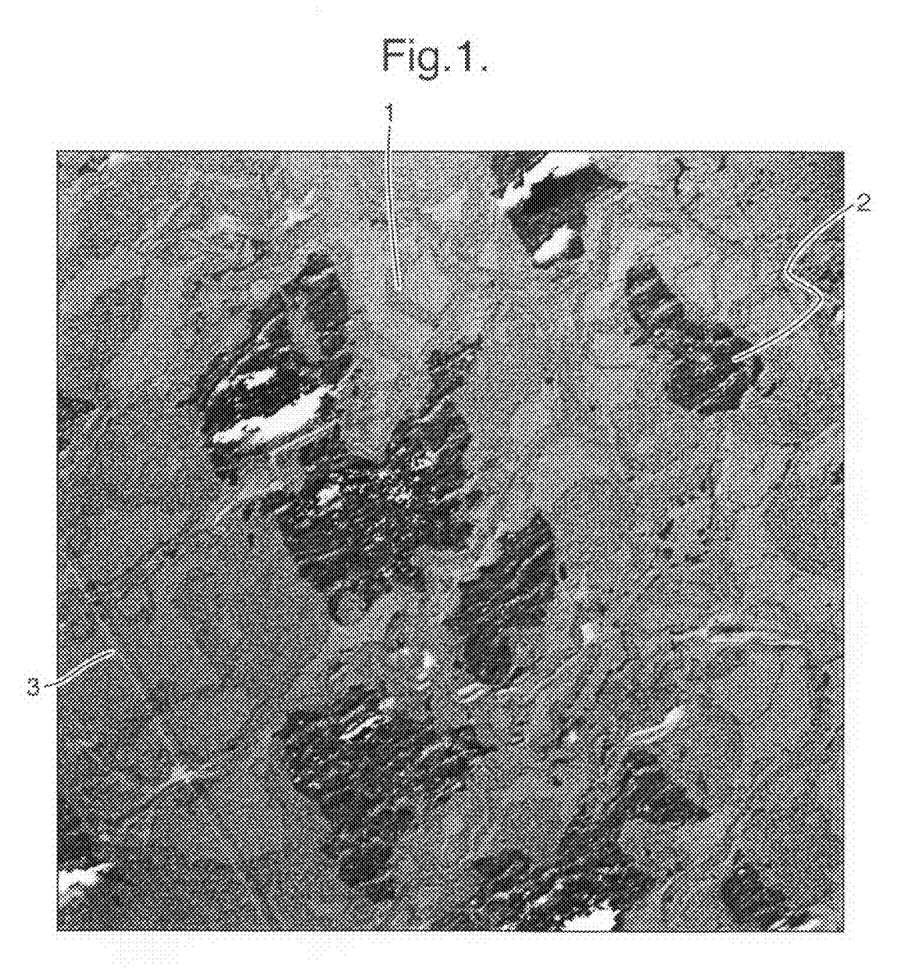
FIG. 1 is a transmission electron micrograph of green leaf tea made from unpressed leaves.
Figure 2:
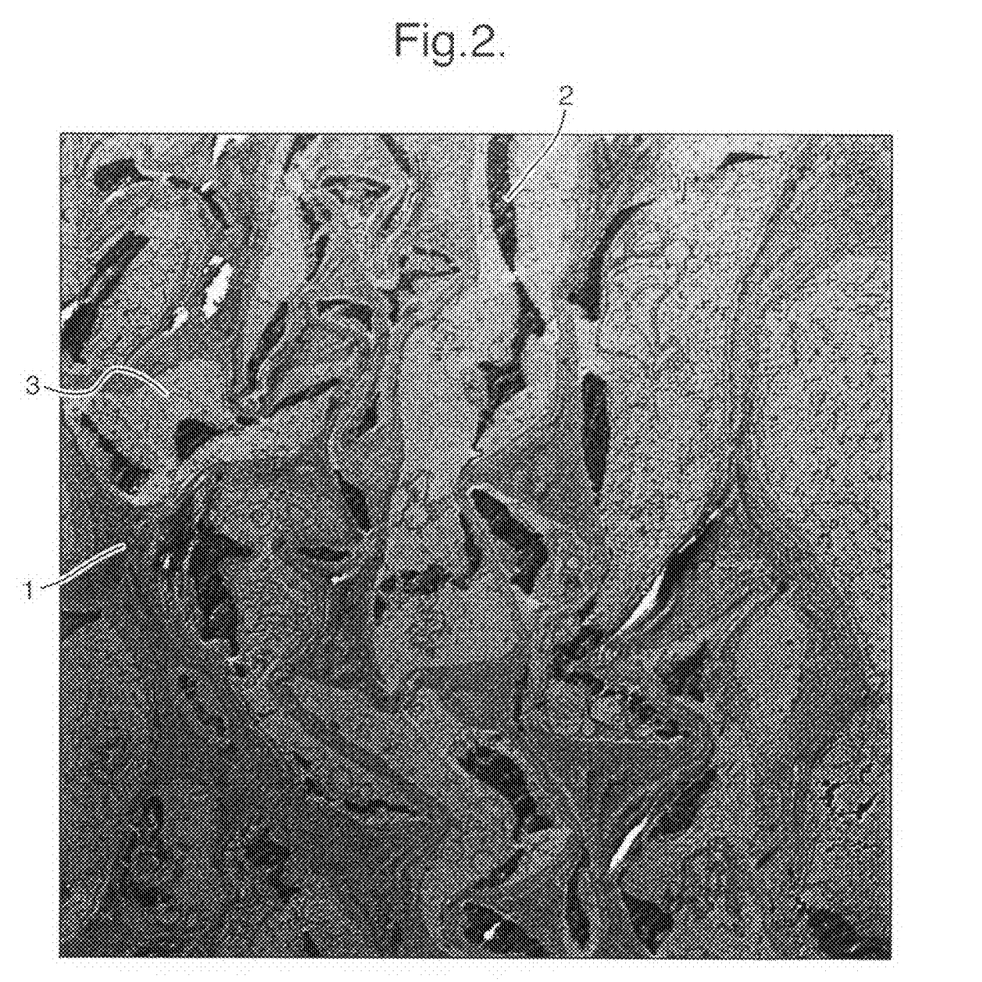
FIG. 2 is a transmission electron micrograph of green leaf tea made from the residue obtained by pressing 240 ml kg$^{-1}$ of juice.
Figure 3:
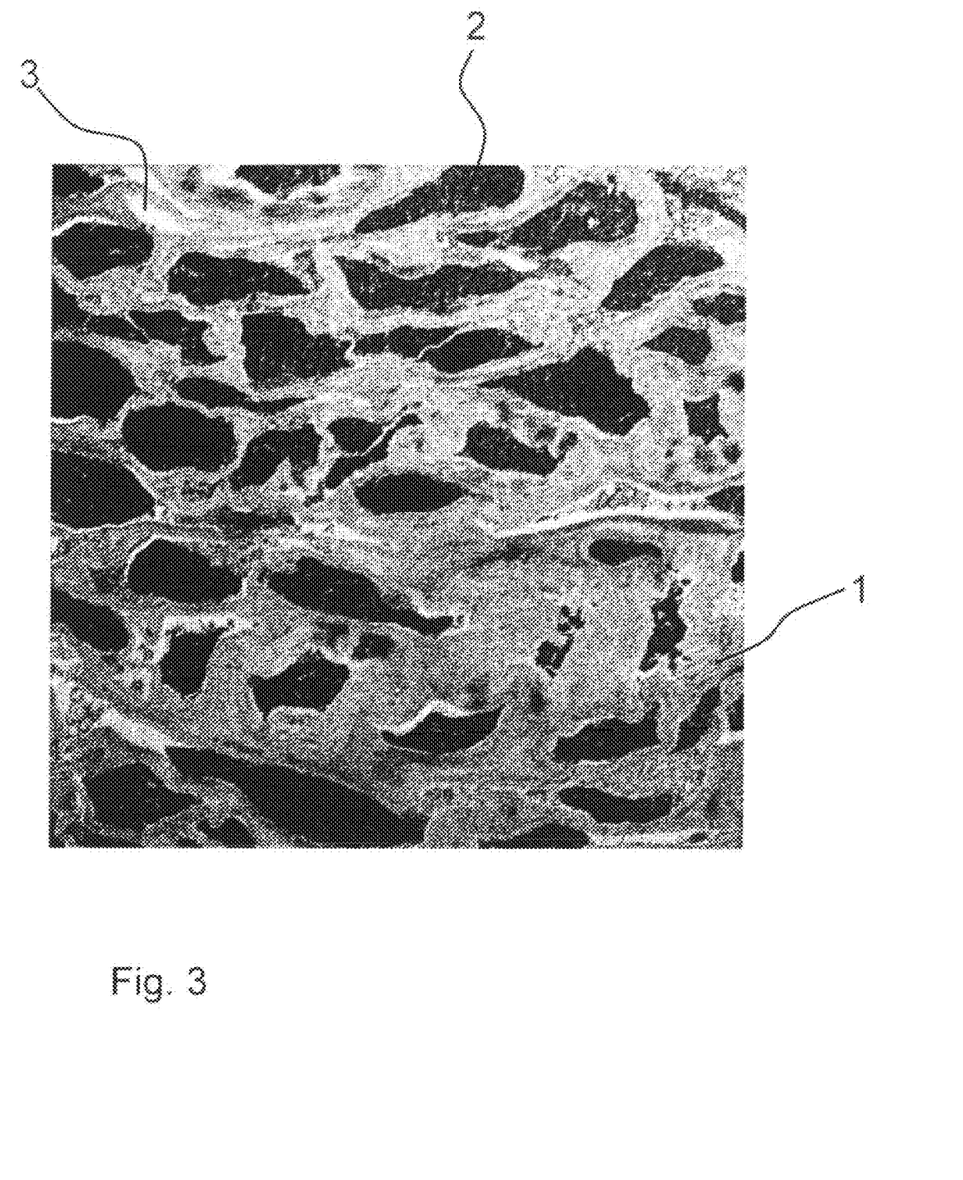
FIG. 3 is a transmission electron micrograph of green leaf tea made from the residue obtained by pressing 500 ml kg$^{-1}$ of juice.

The results are shown in FIGS. 1 to 3 wherein the width of the area shown in each image is around 40 µm.

FIG. 1 is a representative micrograph from the centre of the sample of leaf tea from batch C (unpressed leaf). Apparent from this micrograph are three types of feature, namely cell wall material (1), electron-dense intracellular material (2) and gaps (3) which are assumed to be vacuoles. The gaps (3) and intracellular material (2) appear to be distributed in regions of similar size and with no particular orientation.

FIG. 2 is a representative micrograph from the centre of the sample of leaf tea from batch A (240 ml juice expressed per kg of fresh leaves). It can be seen that the electron-dense intracellular material (2) is now in elongate regions which are generally aligned in a vertical direction (with respect to the way the micrograph is shown). In addition, a significant proportion of the micrograph in FIG. 2 is still made up of gaps (3).

FIG. 3 is a representative micrograph from the centre of the sample of leaf tea from batch B (500 ml juice expressed per kg of fresh leaves). As in FIG. 2, the intra-cellular material (2) is in regions which are elongated and each is generally aligned in a common direction (in this case shown horizontally with respect to the way the micrograph is shown). In stark contrast to the micrograph shown in FIG. 2, however, almost no gaps (3) are visible in the microstructure shown in FIG. 3, which is presumably a result of the greater pressure exerted on batch B during pressing than that exerted on batch A.

The invention claimed is:

1. A process comprising the steps of:
   a) expressing juice from fresh tea leaves thereby to produce leaf residue and tea juice, wherein the amount of expressed juice is between 10 and 300 ml per kg of the fresh tea leaves; and
   b) processing the leaf residue to produce leaf tea;
      wherein said leaf tea is comparable in color and polyphenol content to leaf tea produced in the same manner without the expressing juice step.

2. A process according to claim 1 wherein the tea juice is diluted to produce a beverage.

3. A process according to claim 1 wherein the tea juice is dried to produce a liquid concentrate or powder.

4. A process according to claim 1 wherein the fresh tea leaves comprise material from *Camellia sinensis* var, *assamica*.

5. A process according to claim 1 wherein at least 90% by weight of the leaf tea has a particle size above 35 mesh.

6. A process according to claim 1 wherein the leaf tea is Pekoe Fannings (PF) grade or larger.

7. A process according to claim 5 wherein the leaf tea is sorted to achieve the particle size and/or grade.

8. A process according to claim 1 wherein step (b) comprises fermenting the leaf residue.

9. A process according to claim 8 wherein the leaf tea is black leaf tea.

10. A process according to claim 1 wherein the amount of expressed juice is less than 275 ml per kg of tea leaves.

11. A process according to claim 1 wherein the amount of expressed juice is at least 25 ml per kg of the fresh tea leaves.

12. A process according to claim 1 wherein step (b) comprises processing the leaf residue to produce the leaf tea and then extracting the leaf tea with solvent to produce the tea extract;
   optionally followed by removing at least some of said solvent from said tea extract to produce a concentrated tea extract;
   optionally followed by drying said concentrated tea extract to a powder.

13. A process according to claim 1 wherein the moisture content of the fresh tea leaves from which juice is expressed in step (a) is from 30 to 90% by weight of the fresh tea leaves.

14. A process according to claim 1, wherein the process comprises the additional step of packaging the leaf tea in infusion packages.

* * * * *